(No Model.)

S. M. CHESTER.
VEHICLE RUNNING GEAR.

No. 347,159. Patented Aug. 10, 1886.

Attest
J. Watson Sims
J. Simpson Roebuck

Inventor
Samuel M. Chester
by Wood & Boyd
his Attorneys &c

UNITED STATES PATENT OFFICE.

SAMUEL M. CHESTER, OF CINCINNATI, OHIO.

VEHICLE RUNNING-GEAR.

SPECIFICATION forming part of Letters Patent No. 347,159, dated August 10, 1886.

Application filed June 14, 1886. Serial No. 205,122. (No model.)

*To all whom it may concern:*

Be it known that I, SAMUEL M. CHESTER, a resident of Cincinnati, in the county of Hamilton and State of Ohio, have invented certain new and useful Improvements in Vehicle Running-Gear, of which the following is a specification.

My invention relates to an improvement in the construction of fifth-wheels for vehicle running-gear. It is more especially adapted to the class of running-gear shown in Letters Patent No. 305,998, granted me September 13, 1884, which employs a longitudinal spring for a coupling-arm, connecting the rear axle to the fifth-wheel.

The object of the invention is to provide a suitable fifth-wheel having firm vertical and lateral supports, so as to adapt it to be used as the base of the spring-connection.

Another object of my invention is to more effectually equalize the weight of the load upon the front and rear springs, all of which will be set forth in the description of the accompanying drawings, making a part of this specification, in which—

Figure 1:
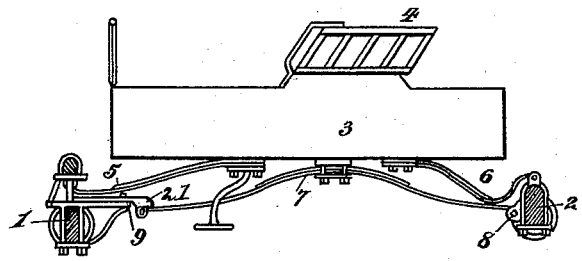
Figure 2:
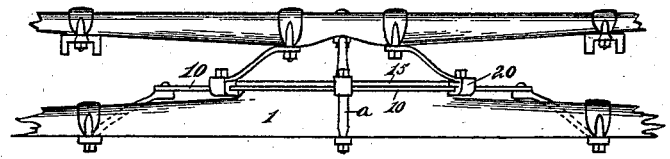
Figure 3:
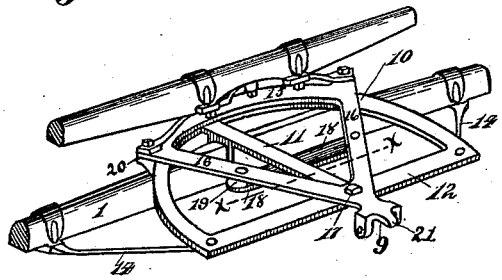
Figure 4:
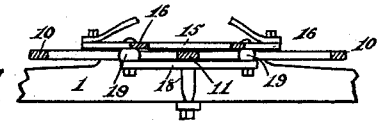

Figure 1 is a side elevation of my improvement attached to a buggy; Fig. 2, a front end view of the fifth-wheel connected to the front axle and spring-bar. Fig. 3 is a rear perspective view of the invention as applied to the axle and spring-bar. Fig. 4 is a cross-section on line $x\,x$, Fig. 3.

1 represents the front axle, 2 the rear axle, 3 the body, and 4 the seat, of an ordinary buggy. 5 represents the front and 6 the rear springs, connecting the body of the buggy to the front and rear axles, respectively.

7 represents the spring-coupling, the rear end of which is attached to an eyebolt-clip, 8. The forward end is attached to the central arm, 9, of the fifth-wheel.

This fifth-wheel is constructed as follows: 10 represents the circular base of the fifth-wheel. It is preferably made semicircular in form. 11 represents a brace-arm connected to the circular base at one end, and to the rear arm, 12, at the rear of the base. To this arm is rigidly secured a clip, *a*, which is attached to the front axle, 1, in the ordinary manner. 14 represents braces, one of the ends of which is connected to the front axle, 1, and the other ends to the rear of the circular base. It will be observed that the circular base is quite large, so as to give it a wide bearing upon the front axle, which, together with the brace-rods and clip, support it very substantially, securing a light as well as rigid construction. This is of the utmost importance, as the spring 7 is used for the coupling-arm, and the strains and thrusts upon the body are imparted to the front axle through the fifth-wheel.

In order to prevent the fifth-wheel from having vertical rocking or lost motion, the top or stationary portion is constructed as follows: 15 represents the track of the fifth-wheel, which bears upon the rim 10. 16 represents arms connected to the segmental track 15, which are joined at their rear ends, connected by pivot-bolt 17 to the arm 12, and extending in rear of this, forming an eye-bar, 9. 18 represents a connecting-arm passing under the central arm, 11, and bolted at each end to arms 16. 19 represents cushions of the thickness of bar 11, interposed between the arm 16 and connecting-rod 18. These are preferably made of rubber, to prevent the transmission of jars to the body of the buggy. This rod serves also to prevent vertical motion of the fifth-wheel. 20 represents hooked lugs formed at the front end of arms 16. These lugs abut against the circular rim 10, and have a lip engaging upon the under side thereof, and effectually prevent vertical motion at the rim of the fifth-wheel.

In order to prevent a tendency of the axle 1 and the fifth-wheel to rock on the spring 7, and to equalize the strains upon the springs 5 6 7, I provide a lug, 21, upon the arm 9, extending backward so as to bear upon the forward arm of spring 7, and prevent the dropping of arm 9 on the spring-center. This lug brings the spring 7 into operation simultaneously with the springs 5 and 6, thereby equalizing the strains between them. By this construction I am enabled to secure a fifth-wheel and a support which is free to turn upon its axis, and yet form a rigid support for the spring-coupling arm, being at once cheap, light, and durable.

Having described my invention, what I claim is—

1. A fifth-wheel composed of the circular rim 10, and central connecting-arm, 11, and lateral braces 14, having a broad bearing upon the front of the axle, to which it is rigidly secured, substantially as specified.

2. In combination with the base of the fifth-wheel rigidly secured to the front axle, and its track pivoted thereto, the connecting-hooks 20 and connecting-bar 18, substantially as specified.

3. The combination, in a fifth-wheel, of the vertically supporting arm 18, connected to arms 16, and passing under arm 11, and provided with the cushions 19, interposed between said bar 18 and its connecting-arms, substantially as specified.

4. In combination with the coupling-spring 7, secured to the rear axle and to the arm of the fifth-wheel, the lug 21, extending backward of the center-bolt connection and resting upon said spring, substantially as specified.

In testimony whereof I have hereunto set my hand.

SAMUEL M. CHESTER.

Witnesses:
ROBERT ZAHNER,
M. E. MILLIKAN.